US012375715B2

(12) United States Patent
Ilola et al.

(10) Patent No.: US 12,375,715 B2
(45) Date of Patent: Jul. 29, 2025

(54) METHOD, AN APPARATUS AND A COMPUTER PROGRAM PRODUCT FOR STREAMING VOLUMETRIC VIDEO CONTENT

(71) Applicant: Nokia Technologies Oy, Espoo (FI)

(72) Inventors: Lauri Aleksi Ilola, Tampere (FI); Sujeet Shyamsundar Mate, Tampere (FI); Saba Ahsan, Espoo (FI); Igor Danilo Diego Curcio, Gravina di Catania (IT); Lukasz Kondrad, Munich (DE); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 142 days.

(21) Appl. No.: 18/240,115

(22) Filed: Aug. 30, 2023

(65) Prior Publication Data
US 2024/0080477 A1    Mar. 7, 2024

(30) Foreign Application Priority Data
Sep. 1, 2022   (FI) ..................... 20225765

(51) Int. Cl.
*H04N 19/597* (2014.01)
*H04N 19/184* (2014.01)
*H04N 19/70* (2014.01)

(52) U.S. Cl.
CPC ......... *H04N 19/597* (2014.11); *H04N 19/184* (2014.11); *H04N 19/70* (2014.11)

(58) Field of Classification Search
CPC ..... H04N 19/597; H04N 19/184; H04N 19/70
USPC ...................................... 375/240.01
See application file for complete search history.

(56) References Cited

U.S. PATENT DOCUMENTS

2018/0367586 A1 * 12/2018 Maze ................. H04N 21/6437

OTHER PUBLICATIONS

Ilola, L. et al., "RTP Payload Format for Visual Volumetric Video-based Coding (V3C)," avtcore WG, Internet Engineering Task Force, Jun. 27, 2022.
Schierl, T. et al., "Signaling Media Decoding Dependency in the Session Description Protocol (SDP)," Network Working Group, Internet Engineering Task Force, Jul. 7, 2009.
Rosenberg, J. et al., "An Offer/Answer Model with the Session Description Protocol (SDP)," Network Working Group, Internet Engineering Task Force, Jul. 3, 2002.

(Continued)

*Primary Examiner* — Jeffery A Williams
(74) *Attorney, Agent, or Firm* — McCarter & English LLP

(57) ABSTRACT

The embodiments relate to methods for encoding and decoding, and technical equipment for the same. The method for encoding obtaining two or more representations of volumetric media content, each of the two or more representations of volumetric media content including multiple media component bitstreams; identifying a relationship between the two or more representations; generating a description file containing a media component description for each media component bitstream; group descriptions grouping the media component descriptions for each media component bitstream; grouping information descriptions providing information on the identified relationship between group descriptions representing representations. The description file is provided to a receiver.

12 Claims, 6 Drawing Sheets

(56) References Cited

OTHER PUBLICATIONS

WG 07 MPEG 3D Graphics Coding Text of ISO/IEC DIS 23090-5 Visual Volumetric Video-based Coding and Video-based Point Cloud Compression $2^{nd}$ Edition, document w20761/N00188. In: $135^{th}$ meeting of MPEG. ISO/IEC JTC 1/SC 29/WG 07.

* cited by examiner

METHOD, AN APPARATUS AND A COMPUTER PROGRAM PRODUCT FOR STREAMING VOLUMETRIC VIDEO CONTENT

TECHNICAL FIELD

The present solution generally relates to streaming of volumetric video content.

BACKGROUND

Volumetric video data represents a three-dimensional (3D) scene or object, and can be used as input for AR (Augmented Reality), VR (Virtual Reality), and MR (Mixed Reality) applications. Such data describes geometry (Shape, size, position in 3D space) and respective attributes (e.g., color, opacity, reflectance, . . . ), and any possible temporal transformations of the geometry and attributes at given time instances (like frames in 2D video). Volumetric video can be generated from 3D models, also referred to as volumetric visual objects, i.e., CGI (Computer Generated Imagery), or captured from real-world scenes using a variety of capture solutions, e.g., multi-camera, laser scan, combination of video and dedicated depth sensors, and more. Also, a combination of CGI and real-world data is possible. Examples of representation formats for volumetric data comprise triangle meshes, point clouds, or voxels. Temporal information about the scene can be included in the form of individual capture instances, i.e., "frames" in 2D video, or other means, e.g., position of an object as a function of time.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for obtaining two or more representations of volumetric media content, each of the two or more representations of volumetric media content consisting of multiple media component bitstreams; means for identifying a relationship between the two or more representations; means for generating a description file, the description file containing;
  a media component description for each media component bitstream;
  group descriptions grouping the media component descriptions for each media component bitstream;
  grouping information descriptions providing information on the identified relationship between group descriptions representing representations;
means for providing the description file to a receiver; means for receiving a modified description file from the receiver; means for determining from the modified description file which media component bitstreams should be delivered to the receiver or whether the receiver has not understood the grouping description; and means for delivering requested media component bitstreams to the receiver or a new description file, if the receiver has not understood the grouping description.

According to a second aspect, there is provided an apparatus for decoding, comprising means for obtaining a description file comprising
  a media component description for each media component bitstream;
  group descriptions grouping the media component descriptions for each media component bitstream;
  grouping information descriptions providing information on the identified relationship between group descriptions representing representations of volumetric media content;
means for identifying the representations and their relationship; means for selecting one or more representations and related media component descriptions based on the derived relationship information; means for generating a modified description file that either contains
  description of the selected representation, or
  information that the grouping description is not understood;
means for sending the modified description file to a sender; means for receiving from the sender the requested media component bitstreams or a new description file, if the grouping information has not been understood; and means for displaying representations corresponding to one or more requested media component bitstreams to a user based on the relationship information.

According to a third aspect, there is provided a method for encoding, comprising obtaining two or more representations of volumetric media content, each of the two or more representations of volumetric media content consisting of multiple media component bitstreams; identifying a relationship between the two or more representations; generating a description file, the description file containing:
  a media component description for each media component bitstream;
  group descriptions grouping the media component descriptions for each media component bitstream;
  grouping information descriptions providing information on the identified relationship between group descriptions representing representations;
providing the description file to a receiver; receiving a modified description file from the receiver indicating which media component bitstreams should be delivered to the receiver or whether the receiver has not understood the grouping description; and delivering requested media component bitstreams to the receiver or a new description file, if the receiver has not understood the grouping description.

According to a fourth aspect, there is provided a method for decoding, comprising obtaining a description file comprising
  a media component description for each media component bitstream;
  group descriptions grouping the media component descriptions for each media component bitstream;
  grouping information descriptions providing information on the identified relationship between group descriptions representing representations of volumetric media content;
identifying the representations and their relationship; selecting one or more representations and related media component descriptions based on the derived relationship information; generating a modified description file that either contains description of the selected representation, or
information that the grouping description is not understood;
sending the modified description file to a sender; receiving from the sender the requested media component bitstreams or a new description file, if the grouping has not been understood; and displaying representations corresponding to one or more requested media component bitstreams to a user based on the relationship information.

According to a fifth aspect, there is provided an apparatus for encoding, the apparatus comprising at least one processor, memory including computer program code, the memory and the computer program code configured to, with the at least one processor, cause the apparatus to perform at least the following: obtain two or more representations of volumetric media content, each of the two or more representations of volumetric media content consisting of multiple media component bitstreams; identify a relationship between the two or more representations; generate a description file, the description file containing
    a media component description for each media component bitstream;
    group descriptions grouping the media component descriptions for each media component bitstream;
    grouping information descriptions providing information on the identified relationship between group descriptions representing representations;
provide the description file to a receiver; receive a modified description file from the receiver; determine from the modified description file which media component bitstreams should be delivered to the receiver or whether the receiver has not understood the grouping description; and deliver requested media component bitstreams to the receiver or a new description file, if the receiver has not understood the grouping description.

According to a sixth aspect, there is provided an apparatus for decoding, the apparatus comprising at least one processor, memory including computer program code, the memory and the computer program code configured to, with the at least one processor, cause the apparatus to perform at least the following: obtain a description file comprising
    a media component description for each media component bitstream;
    group descriptions grouping the media component descriptions for each media component bitstream;
    grouping information descriptions providing information on the identified relationship between group descriptions representing representations of volumetric media content;
identify the representations and their relationship; selecting one or more representations and related media component descriptions based on the derived relationship information; generate a modified description file that either contains
    description of the selected representation, or
    information that the grouping description is not understood;
send the modified description file to a sender; receive from the sender the requested media component bitstreams or a new description file, if the grouping has not been understood; and display representations corresponding to one or more requested media component bitstreams to a user based on the relationship information.

According to a seventh aspect, there is provided computer program product for encoding comprising computer program code configured to, when executed on at least one processor, cause an apparatus or a system to: obtain two or more representations of volumetric media content, each of the two or more representations of volumetric media content consisting of multiple media component bitstreams; identify a relationship between the two or more representations; generate a description file, the description file containing
    a media component description for each media component bitstream;
    group descriptions grouping the media component descriptions for each media component bitstream;
    grouping information descriptions providing information on the identified relationship between group descriptions representing representations;
provide the description file to a receiver; receive a modified description file from the receiver; determine from the modified description file which media component bitstreams should be delivered to the receiver or whether the receiver has not understood the grouping description; and deliver requested media component bitstreams to the receiver or a new description file, if the receiver has not understood the grouping description.

According to an eighth aspect, there is provided computer program product for decoding comprising computer program code configured to, when executed on at least one processor, cause an apparatus or a system to: obtain a description file comprising
    a media component description for each media component bitstream;
    group descriptions grouping the media component descriptions for each media component bitstream;
    grouping information descriptions providing information on the identified relationship between group descriptions representing representations of volumetric media content;
identify the representations and their relationship; selecting one or more representations and related media component descriptions based on the derived relationship information; generate a modified description file that either contains
    description of the selected representation, or
    information that the grouping description is not understood;
send the modified description file to a sender; receive from the sender the requested media component bitstreams or a new description file, if the grouping has not been understood; and display representations corresponding to one or more requested media component bitstreams to a user based on the relationship information.

According to an embodiment the relationship is identified by examining the two or more representations, or their media component bitstreams, or by interpreting external signaling.

According to an embodiment the description file is a Session Description Protocol.

According to an embodiment the media component bitstreams are packed in a real-time transfer protocol (RTP) media stream.

According to an embodiment a presentation consists of a V3C bitstream.

According to an embodiment a group identifier is added for each group of media stream.

According to an embodiment, the selecting of the one or more representations is performed according to the derived relationship information and optionally also one or more of the following: the available network, computational resources, application preference, user preference.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
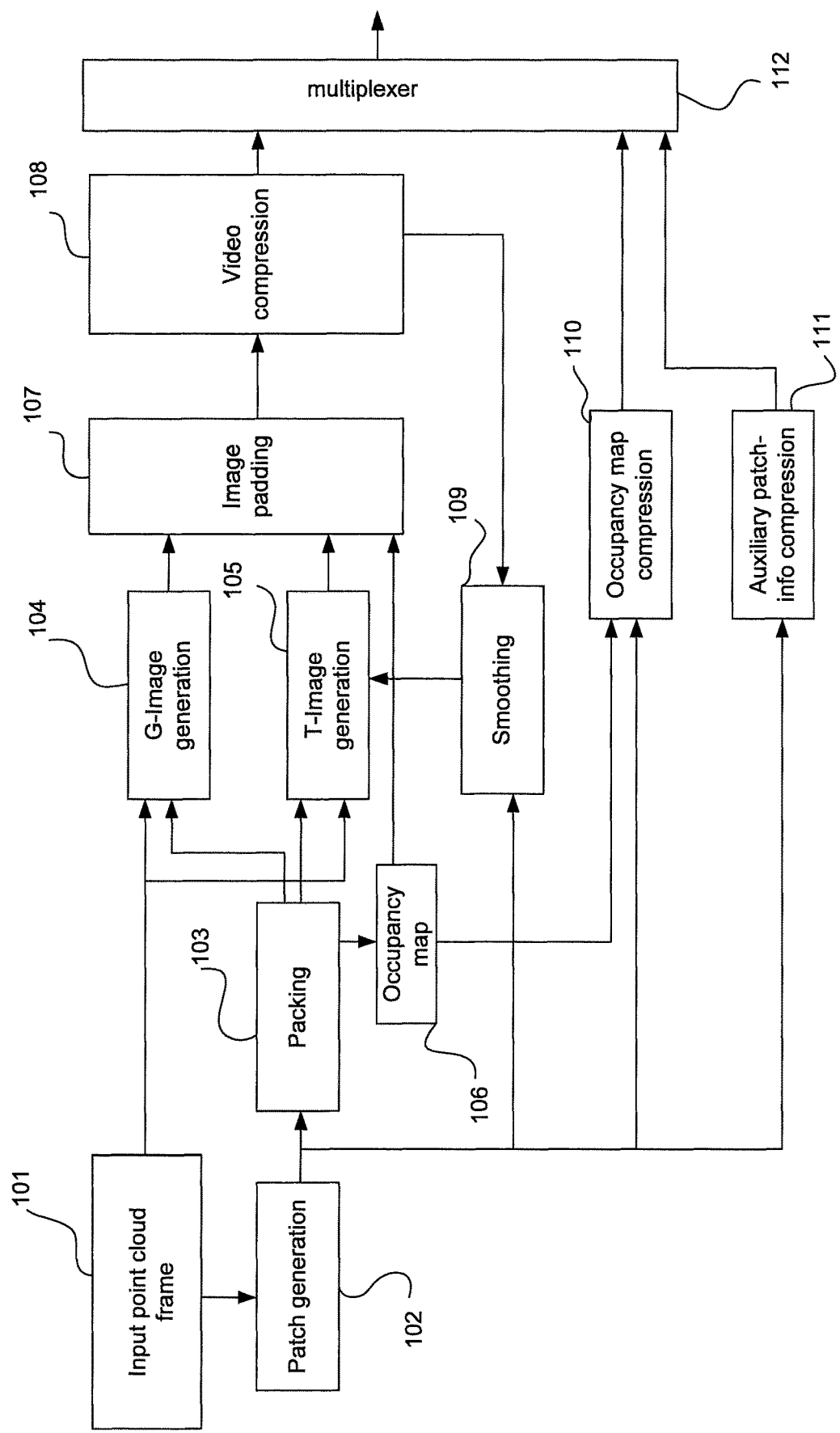
FIG. 1 shows an example of a compression process of a volumetric video.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment is included in at least one embodiment of the disclosure.

An immersive six degrees of freedom (6DoF) representation enables a larger viewing-space, wherein viewers have both translational and rotational freedom of movement. In a 3DoF visual experience, content is presented to viewers as if they were positioned at the center of a scene, looking outwards, with all parts of the content positioned at a constant distance. 6DoF experiences allow viewers to move freely in the scene and experience the content from various viewpoints. Contrarily to 3DoF, 6DoF videos enable perception of motion parallax, where the change in relative geometry between objects is reflected with the pose of the viewer.

There are many ways to capture and represent a Volumetric frame. The format used to capture and represent it, depends on the processing to be performed on it, and the target application using it. Some of the example representations are listed below:

A volumetric frame can be represented as a point cloud. A point cloud is a set of unstructured points in 3D space, where each point is characterized by its position in a 3D coordinate system (e.g. Euclidean), and some corresponding attributes (e.g., color information provided as RGBA value, or normal vectors)

A volumetric frame can be represented as images, with or without depth, captured from multiple viewpoints in 3D space. In other words, it can be represented by one or more view frames (where a view is a projection of a volumetric scene on to a plane (e.g., a camera plane) using a real or virtual camera with known/computed extrinsics and intrinsics). Each view may be represented by a number of components (e.g., geometry, color, transparency, and occupancy picture), which may be part of the geometry picture or represented separately.

A volumetric frame can be represented as a mesh. Mesh is a collection of points, called vertices, and connectivity information between vertices, called edges. Vertices along with edges form faces. The combination of vertices, edges and faces can uniquely approximate shapes of objects.

Depending on the capture, a volumetric frame can provide viewers the ability to navigate a scene with six degrees of freedom, i.e., both translational and rotational movement of their viewing pose (which includes yaw, pitch, and roll). The data to be coded for a volumetric frame can also be significant, as a volumetric frame can contain many objects, and the positioning and movement of these objects in the scene can result in many dis-occluded regions. Furthermore, the interaction of light and materials in objects and surfaces in a volumetric frame can generate complex light fields that can produce texture variations for even a slight change of pose.

A sequence of volumetric frame is a volumetric video. Due to large amount of information, storage and transmission of a volumetric video requires compression. A way to compress a volumetric frame can be to project 3D geometry and related attributes into a collection of 2D images along with additional associated metadata. The projected 2D images can then be coded using 2D video and image coding technologies, for example ISO/IEC 14496-10 (H.264/AVC) and ISO/IEC 23008-2 (H.265/HEVC). The metadata can be coded with technologies specified in specification such as ISO/IEC 23090-5. The coded images and the associated metadata can be stored or transmitted to a client that can decode and render the 3D volumetric frame.

The introduction of unconstrained viewer translation and motion parallax increases the amount of data to describe the volumetric scene. Hence, the Motion Picture Experts Group (MPEG) has specified the Visual Volumetric Video-based Coding (V3C) standard ISO/IEC 23090-5 (ISO/IEC 23090-5, 2021) to efficiently code dynamic volumetric visual scenes. This standard caters to virtual reality (VR), augmented reality (AR), and mixed reality (MR) applications, such as gaming, sports, broadcasting, motion picture productions, and telepresence. Like V3C coding standards, the system aspects for volumetric content leverage existing technologies and frameworks for traditional 2D video. The ISO/IEC 23090-10 standard defines how V3C-coded content may be stored in an ISO-based media file format (ISOBMFF)(ISO/IEC 14496-12, 2020) container as timed and non-timed data, providing the ability to multiplex V3C media with other types of media, such as audio, video, or image. Moreover, the standard defines extensions to the Dynamic Adaptive Streaming over Hypertext Transfer Protocol (HTTP)(DASH)(ISO/IEC 23009-1, 2019) and MPEG Media Transport (MMT) (ISO/IEC 23008-1, 2017) frameworks to enable a delivery of V3C-coded content over a network leveraging existing multimedia delivery infrastructures.

The V3C standard defines a generic mechanism for coding volumetric video and can be used by applications targeting different flavors of volumetric content, such as point clouds, immersive video with depth, or even mesh representations of visual volumetric frames. So far, MPEG has specified two applications that utilize V3C: video-based point cloud compression (V-PCC), also specified in ISO/IEC 23090-5 (ISO/IEC 23090-5, 2021), and MPEG immersive video (MIV) specified in ISO/IEC 23090-12 (ISO/IEC 23090-12, 2021). V3C compresses volumetric video by taking advantage of the performance and ubiquity of traditional 2D video coding technologies. To achieve this, each volumetric frame is transformed from its 3D representation into multiple 2D representations and associated metadata, known as atlas data in the V3C specification. After the conversion from 3D to 2D, the resulting 2D representations are compressed using traditional video codecs, while atlas data are compressed with a separate encoding mechanism defined in ISO/IEC 23090-5 (ISO/IEC 23090-5, 2021).

ISO/IEC 23090-5 specifies the syntax, semantics and process for coding volumetric video. The specified syntax is designed to be generic so that it can be reused for a variety of applications. Point clouds, immersive video with depth, and mesh representations can all use ISO/IEC 23090-5 standard with extensions that deal with the specific nature of the final representation. The purpose of the specification is to define how to decode and interpret the associated data (for example atlas data in ISO/IEC 23090-5) which tells a renderer how to interpret 2D frames to reconstruct a volumetric frame.

FIG. 1 illustrates an overview of an example of a compression process of a volumetric video. Such process may be applied for example in MPEG Point Cloud Coding (PCC). The process starts with an input point cloud frame 101 that is provided for patch generation 102, geometry image generation 104 and texture image generation 105.

The patch generation 102 process aims at decomposing the point cloud into a minimum number of patches with smooth boundaries, while also minimizing the reconstruction error. For patch generation, the normal at every point can be estimated. An initial clustering of the point cloud can then be obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0)

More precisely, each point may be associated with the plane that has the closest normal (i.e., maximizes the dot product of the point normal and the plane normal).

The initial clustering may then be refined by iteratively updating the cluster index associated with each point based on its normal and the cluster indices of its nearest neighbors. The final step may comprise extracting patches by applying a connected component extraction procedure.

Patch info determined at patch generation 102 for the input point cloud frame 101 is delivered to packing process 103, to geometry image generation 104 and to texture image generation 105. The packing process 103 aims at mapping the extracted patches onto a 2D plane, while trying to minimize the unused space, and guaranteeing that every T×T (e.g., 16×16) block of the grid is associated with a unique patch. It should be noticed that T may be a user-defined parameter. Parameter T may be encoded in the bitstream and sent to the decoder.

The used simple packing strategy iteratively tries to insert patches into a W×H grid. W and H may be user-defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid may be temporarily doubled, and search is applied again. At the end of the process, H is clipped so as to fit the used grid cells.

The geometry image generation 104 and the texture image generation 105 are configured to generate geometry images and texture images respectively. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). The first layer, also called a near layer, stores the point of H(u, v) with the lowest depth D0. The second layer, referred to as the far layer, captures the point of H(u, v) with the highest depth within the interval [D0, D0+Δ], where Δ is a user-defined parameter that describes the surface thickness. The generated videos may have the following characteristics:

Geometry: W×H YUV420-8 bit,
Texture: W×H YUV420-8 bit,

It is to be noticed that the geometry video is monochromatic. In addition, the texture generation procedure exploits the reconstructed/smoothed geometry in order to compute the colors to be associated with the re-sampled points.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM (Deep Occupancy Map) may comprise binary values or other values, for example integer values. It should be noticed that one cell of the 2D grid may produce a pixel during the image generation process. Such an occupancy map may be derived from the packing process 103.

The padding process 107 aims at filling the empty space between patches in order to generate a piecewise smooth image suited for video compression. For example, in a simple padding strategy, each block of T×T (e.g., 16×16) pixels is compressed independently. If the block is empty (i.e., unoccupied, i.e., all its pixels belong to empty space), then the pixels of the block are filled by copying either the last row or column of the previous T×T block in raster order. If the block is full (i.e., occupied, i.e., no empty pixels), nothing is done. If the block has both empty and filled pixels (i.e., edge block), then the empty pixels are iteratively filled with the average value of their non-empty neighbors.

The padded geometry images and padded texture images may be provided for video compression 108. The generated images/layers may be stored as video frames and compressed using for example the HM16.16 video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch.

For example, the following metadata may be encoded/decoded for every patch:
index of the projection plane
Index 0 for the planes (1.0, 0.0, 0.0) and (−1.0, 0.0, 0.0)
Index 1 for the planes (0.0, 1.0, 0.0) and (0.0, −1.0, 0.0)
Index 2 for the planes (0.0, 0.0, 1.0) and (0.0, 0.0, −1.0)
2D bounding box (u0, v0, u1, v1)
3D location (x0, y0, z0) of the patch represented in terms of depth δ0, tangential shift s0 and bitangential shift r0. According to the chosen projection planes, (δ0, s0, r0) may be calculated as follows:

$$\delta0=x0, s0=z0 \text{ and } r0=y0 \quad \text{Index 0,}$$

$$\delta0=y0, s0=z0 \text{ and } r0=x0 \quad \text{Index 1,}$$

$$\delta0=z0, s0=x0 \text{ and } r0=y0 \quad \text{Index 2,}$$

Also, mapping information providing for each T×T block its associated patch index may be encoded as follows:
For each T×T block, let L be the ordered list of the indexes of the patches such that their 2D bounding box contains that block. The order in the list is the same as the order used to encode the 2D bounding boxes. L is called the list of candidate patches.
The empty space between patches is considered as a patch and is assigned the special index 0, which is added to the candidate patches list of all the blocks.
Let I be index of the patch, which the current T×T block belongs to, and let J be the position of I in L. Instead of explicitly coding the index I, its position J is arithmetically encoded instead, which leads to better compression efficiency.

The occupancy map consists of a binary map that indicates for each cell of the grid whether it belongs to the empty space or to the point cloud. One cell of the 2D grid produces a pixel during the image generation process.

The occupancy map compression 110 leverages the auxiliary information described in previous section, in order to detect the empty T×T blocks (i.e., blocks with patch index 0). The remaining blocks may be encoded as follows: The occupancy map can be encoded with a precision of a B0×B0 blocks. B0 is a configurable parameter. In order to achieve lossless encoding, B0 may be set to 1. In practice B0=2 or B0=4 results in visually acceptable results, while significantly reducing the number of bits required to encode the occupancy map.

The compression process may comprise one or more of the following example operations:
Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
If all the sub-blocks of a T×T block are full (i.e., have value 1). The block is said to be full. Otherwise, the block is said to be non-full.
A binary information may be encoded for each T×T block to indicate whether it is full or not.
If the block is non-full, an extra information indicating the location of the full/empty sub-blocks may be encoded as follows:
Different traversal orders may be defined for the sub-blocks, for example horizontally, vertically, or diagonally starting from top right or top left corner
The encoder chooses one of the traversal orders and may explicitly signal its index in the bitstream.
The binary values associated with the sub-blocks may be encoded by using a run-length encoding strategy.
The binary value of the initial sub-block is encoded.
Continuous runs of 0s and 1s are detected, while following the traversal order selected by the encoder.
The number of detected runs is encoded.
The length of each run, except of the last one, is also encoded.

Figure 2:
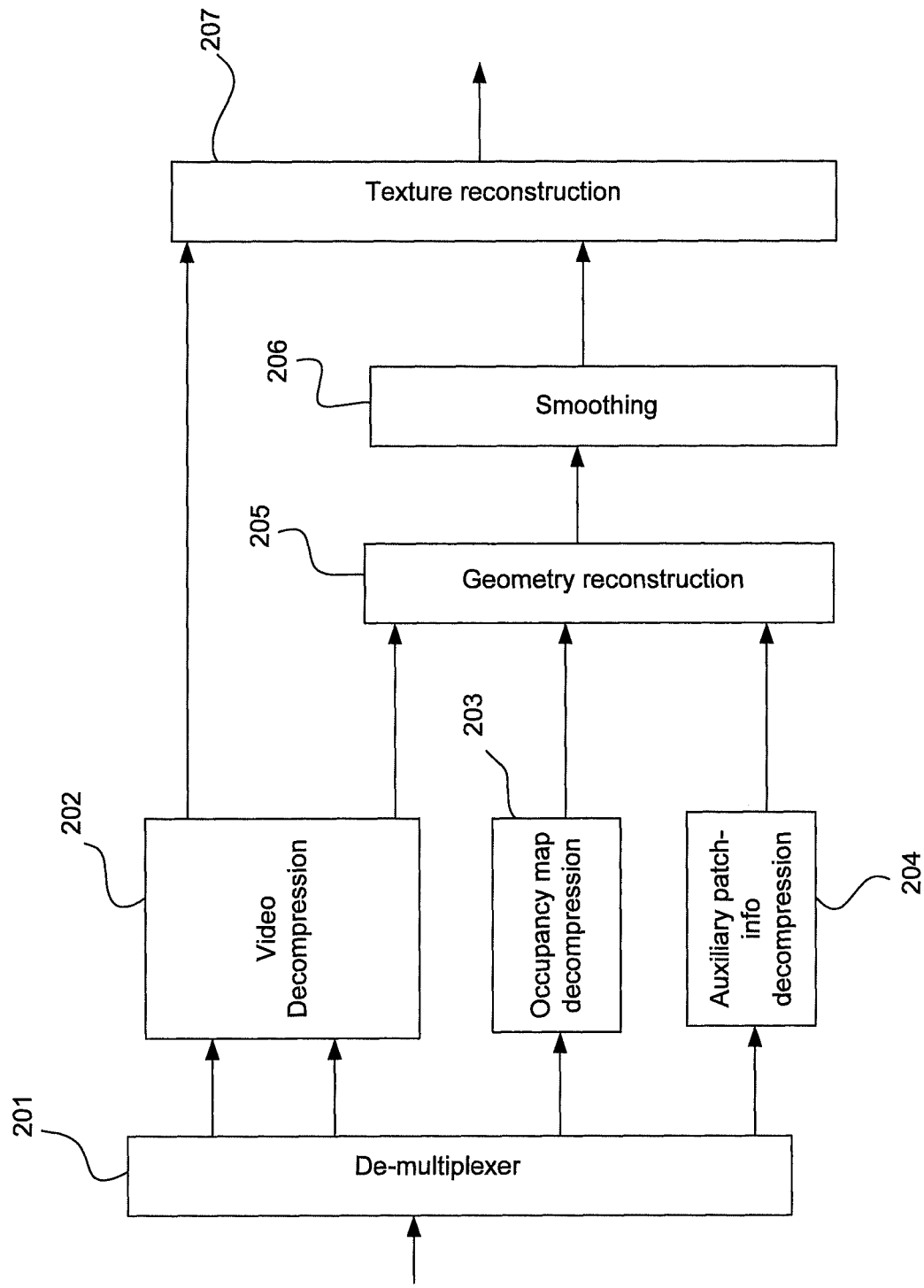
FIG. 2 shows an example of a de-compression process of a volumetric video.

FIG. 2 illustrates an overview of a de-compression process for MPEG Point Cloud Coding (PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture reconstruction 207 outputs a reconstructed point cloud. The texture values for the texture reconstruction are directly read from the texture images.

MIV and V-PCC use a number of V3C syntax elements with a slightly modified semantics. An example of how the generic syntax element can be differently interpreted by the application is pdu_projection_id.
In case of V-PCC, the syntax element pdu_projection_id specifies the index of the projection plane for the patch. There can be 6 or 18 projection planes in V-PCC, and they are implicit, i.e., pre-determined.
In case of MIV, the syntax element pdu_projection_id corresponds to a view ID, i.e., identifies which view the patch originated from. View IDs and their related information is explicitly provided in MIV view parameters list and may be tailored for each content.

MPEG 3DG (ISO SC 29 WG7) group has started work on a third application of V3C—the mesh compression. It is also envisaged that mesh coding will re-use V3C syntax as much as possible and can also slightly modify the semantics.

To differentiate between applications of V3C bitstream, that allows a client to properly interpret the decoded data, V3C uses the ptl_profile_toolset_idc parameter.

Figure 3:
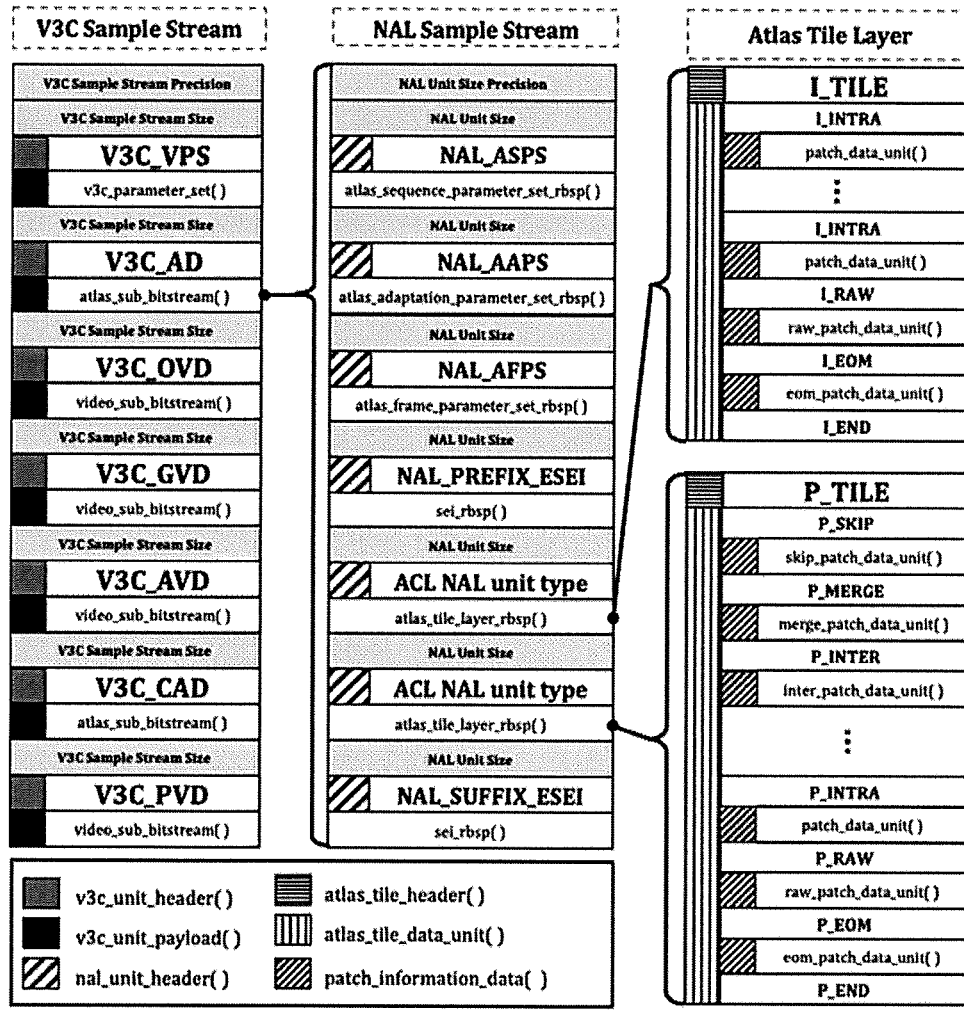
FIG. 3 shows an example of a V3C bitstream originated from ISO/IEC 23090-5.

V3C bitstream is a sequence of bits that forms the representation of coded volumetric frames and the associated data making one or more coded V3C sequences (CVS). Where CVS is a sequence of bits identified and separated by appropriate delimiters, and is required to start with a VPS, includes a V3C unit, and contains one or more V3C units with atlas sub-bitstream or video sub-bitstream. This is illustrated in FIG. 3. Video sub-bitstream and atlas sub-bitstreams can be referred to as V3C sub-bitstreams. A V3C unit header in conjunction with VPS information identify which V3C sub-bitstream a V3C unit contains and how to interpret it. An example of this is shown herein below:

|  | Descriptor |
|---|---|
| v3c_unit_header( ) { | |
|   vuh_unit_type | u(5) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_CAD \|\| vuh_unit_type == V3C_PVD ) | |
|     vuh_v3c_parameter_set_id | u(4) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_PVD ) | |
|     vuh_atlas_id | u(6) |
|   if( vuh_unit_type == V3C_AVD ) { | |
|     vuh_attribute_index | u(7) |
|     vuh_attribute_partition_index | u(5) |
|     vuh_map_index | u(4) |
|     vuh_auxiliary_video_flag | u(1) |
|   } else if( vuh_unit_type == V3C_GVD ) { | |
|     vuh_map_index | u(4) |
|     vuh_auxiliary_video_flag | u(1) |
|     vuh_reserved_zero_12bits | u(12) |
|   } else if( vuh_unit_type == V3C_OVD \|\| vuh_unit_type == V3C_AD \|\| | |
|     vuh_unit_type == V3C_PVD ) | |
|     vuh_reserved_zero_17bits | u(17) |
|   else if( vuh_unit_type == V3C_CAD ) | |
|     vuh_reserved_zero_23bits | u(23) |
|   else | |
|     vuh_reserved_zero_27bits | u(27) |
| } | |

A V3C bitstream can be stored according to Annex C of ISO/IEC 23090-5 which specifies syntax and semantics of a sample stream format to be used by applications that deliver some or all of the V3C unit stream as an ordered stream of bytes or bits within which the locations of V3C unit boundaries need to be identifiable from patters in the data.

Considering that V3C compresses volumetric content using video codecs, traditional video coding systems can be leveraged. As such, video components containing occupancy, geometry or attribute information may be encapsulated into a Real Time Transfer Protocol RTP video streams. There is also ongoing work to define multiple RTP payload format for atlas data, which would enable streaming of volumetric content over multiple RTP streams.

RTP is intended for an end-to-end, real-time transfer of streaming media and provides facilities for jitter compensation and detection of packet loss and out-of-order delivery. RTP allows data transfer to multiple destinations through IP multicast or to a specific destination through IP unicast. The majority of the RPT implementations are built on top of the User Datagram Protocol (UDP). Other transport protocols may also be utilized. RTP is used in together with other protocols such as H.323 and Real Time Streaming Protocols (RTSP).

The RTP specification describes two protocols: RPT and RTCP. RTP is used for the transfer of multimedia data, and its companion protocol (RTCP) is used to periodically send control information and QoS parameters.

RTP sessions may be initiated between a client and a server or between a client and another client (or a multi-party topology) using a signalling protocol, such as H.323, the Session Initiation Protocol (SIP), or RTSP. These protocols may use the Session Description Protocol (RFC 8866) to specify the parameters for the sessions.

RTP is designed to carry a multitude of multimedia formats, which permit the transport of new formats without revising the RTP standard. To this end, the information required by a specific application of the protocol is not included in the generic RTP header. For a class of applications (e.g., audio, video), an RTP profile may be defined. For a media format (e.g., a specific video coding format), an associated RTP payload format may be defined. Every instantiation of RTP in a particular application may require a profile and payload format specifications.

The profile defines the codecs used to encode the payload data, and their mapping to payload format codecs in the protocol field Payload Type (PT) of the RTP header.

For example, the RTP profile for audio and video conferences with minimal control is defined in RFC 3551. The profile defines a set of static payload type assignments, and a dynamic mechanism for mapping between a payload format, and a PT value using Session Description Protocol (SDP). The latter mechanism is used for newer video codec such as RTP payload format for H.264 Video defined in RFC 6184 or RTP Payload Format for High Efficiency Video Coding (HEVC9 defined in RFC 7798.

An RTP session is established for each multimedia stream. Audio and video streams may use separate RTP sessions, enabling a receiver to selectively receive components of a particular stream. The RTP specification recommends even port numbers for RTP, and the use of the next odd port number for the associated RTCP session. A single port can be used for RTP and RTCP in applications that multiplex the protocols.

Each RTP stream consists of RTP packets, which in turn consist or RTP header and payload parts.

In this disclosure, the Session Description Protocol (SDP) is used as an example of a session specific file format. SDP is a format for describing multimedia communication sessions for the purpose of announcement and invitation. Its predominant use is in support of streaming media applications. SDP does not deliver any media streams itself but is used between endpoints for negotiation of network metrics, media types, bandwidth requirements and other associated properties. The set of properties and parameters is called a session profile. SDP is extensible for the support of new media types and formats. SDP is widely deployed in the industry and is used for session initialization by various other protocols such as SIP or WebRTC related session negotiation.

The Session Description Protocol describes a session as a group of fields in a text-based format, one field per line. The form of a field is as follows:

<character>=<value><CR><LF>

Where <character> is a single case-sensitive character and <value> is structured text in a format that depends on the character. Values are typically UTF-8 encoded. Whitespace is not allowed immediately to either side of the equal sign.

Session descriptions consist of three sections: session, timing, and media descriptions. Each description may contain multiple timing and media descriptions. Names are only unique within the associated syntactic construct.

Fields must appear in the order shown; optional fields are marked with an asterisk v=(protocol version number, currently only 0)
o=(originator and session identifier: username, id, version number, network address)
s=(session name: mandatory with at least one UTF-8-encoded character)
i=* (session title or short information)
u=* (URI of description)
e=* (zero or more email address with optional name of contacts)
p=* (zero or more phone number with optional name of contacts)
c=* (connection information—not required if included in all media)
b=* (zero or more bandwidth information lines)
One or more time descriptions ("t=" and "r=" lines; see below)
z=* (time zone adjustments)
k=* (encryption key)
a=* (zero or more session attribute lines)
Zero or more Media descriptions (each one starting by an "m=" line; see below)
Time Description (Mandatory)
  t=(time the session is active)
  r=* (zero or more repeat times)
Media Description (Optional)
  m=(media name and transport address)
  i=* (media title or information field)
  c=* (connection information—optional if included at session level)
  b=* (zero or more bandwidth information lines)
  k=* (encryption key)
  a=* (zero or more media attribute lines—overriding the Session attribute lines)

Below is a sample session description from RFC 4566. This session is originated by the user "jdoe", at IPv4 address 10.47.16.5. Its name is "SDP Seminar" and extended session information ("A Seminar on the session description protocol") is included along with a link for additional information and an email address to contact the responsible party, Jane Doe. This session is specified to last for two hours using NTP timestamps, with a connection address (which indicates the address clients must connect to or—when a multicast address is provided, as it is here—subscribe to) specified as IPv4 224.2.17.12 with a TTL of 127. Recipients of this session description are instructed to only receive media. Two media descriptions are provided, both using the RTP Audio/Video Profile. The first is an audio stream on port 49170 using RTP/AVP payload type 0 (defined by RFC 3551 as PCMU), and the second is a video stream on port 51372 using RTP/AVP payload type 99 (defined as "dynamic"). Finally, an attribute is included which maps RTP/AVP payload type 99 to format h263-1998 with a 90 kHz clock rate. RTCP ports for the audio and video streams of 49171 and 51373, respectively, are implied.

v=0
o=jdoe 2890844526 2890842807 IN IP4 10.47.16.5
s=SDP Seminar
i=A Seminar on the session description protocol
u=http://www.example.com/seminars/sdp.pdf
e=j.doe@example.com (Jane Doe)
c=IN IP4 224.2.17.12/127
t=2873397496 2873404696
a=recvonly
m=audio 49170 RTP/AVP 0
m=video 51372 RTP/AVP 99
a=rtpmap:99 h263-1998/90000

SDP uses attributes to extend the core protocol. Attributes can appear within the Session or Media sections and are scoped accordingly as session-level or media-level. New attributes can be added to the standard through registration with IANA. A media description may contain any number of "a=" lines (attribute-fields) that are media description specific. Session-level attributes convey additional information that applies to the session as a whole rather than to individual media descriptions.

Attributes are either properties or values:
a=<attribute-name>
a=<attribute-name>:<attribute-value>

Examples of attributes defined in RFC8866 are "rtpmap" and "fmpt".

"rtpmap" attribute maps from an RTP payload type number (as used in an "m=" line) to an encoding name denoting the payload format to be used. It also provides information on the clock rate and encoding parameters. Up to one "a=rtpmap:" attribute can be defined for each media format specified. Thus, we might have the following:

m=audio 49230 RTP/AVP 96 97 98
a=rtpmap:96 L8/8000
a=rtpmap:97 L16/8000
a=rtpmap:98 L16/11025/2

In the example above, the media types are "audio/L8" and "audio/L16".

Parameters added to an "a=rtpmap:" attribute should only be those required for a session directory to make the choice of appropriate media to participate in a session. Codec-specific parameters should be added in other attributes, for example, "fmtp"

"fmtp" attribute allows parameters that are specific to a particular format to be conveyed in a way that SDP does not have to understand them. The format must be one of the formats specified for the media. Format-specific parameters, semicolon separated, may be any set of parameters required to be conveyed by SDP and given unchanged to the media tool that will use this format. At most one instance of this attribute is allowed for each format. An example is:

a=fmtp:96 profile-level-id=42e016;max-mbps=108000; max-fs=3600

For example RFC7798 defines the following sprop-vps, sprop-sps, sprop-pps, profile-space, profile-id, tier-flag, level-id, interop-constraints, profile-compatibility-indicator, sprop-sub-layer-id, recv-sub-layer-id, max-recv-level-id, tx-mode, max-lsr, max-lps, max-cpb, max-dpb, max-br, max-tr, max-tc, max-fps, sprop-max-don-diff, sprop-depack-buf-nalus, sprop-depack-buf-bytes, depack-buf-cap, sprop-segmentation-id, sprop-spatial-segmentation-idc, dec-parallel-cap, and include-dph.

"group" and "mid" attributes defined in RFC 5888 allows to group "m" lines in SDP for different purposes. An example can be for lip synchronization or for receiving a media flow consisting of several media streams on different transport addresses.

An example would be in a given session description, each "m" line is identified by a token, which is carried in a "mid" attribute below the "m" line. The session description carries session-level "group" attributes that group different "m" lines (identified by their tokens) using different group semantics. The semantics of a group describe the purpose for which the "m" lines are grouped. In the example below, the "group" line indicates that the "m" lines identified by tokens 1 and 2 (the audio and the video "m" lines, respectively) are grouped for the purpose of lip synchronization (LS).

v=0
o=Laura 289083124 289083124 IN IP4 one.example.com
c=IN IP4 192.0.2.1
t=0 0
a=group:LS 1 2
m=audio 30000 RTP/AVP 0
a=mid:1
m=video 30002 RTP/AVP 31
a=mid:2

RFC5888 defines two semantics for group Lip Synchronization (LS), as used in the example above, and Flow Identification (FID). RFC5583 defines another grouping type Decoding Dependency (DDP). RFC8843 defines another grouping type BUNDLE, which among other is utilized when multiple types of media are sent in a single RTP session as described in RFC8860.

Two media-level and one session-level attributes are used in a mechanism for providing alternative SDP lines. One or more SDP lines at media level can be replaced, if desired, by alternatives. The mechanism is backwards compatible in the way that a receiver that does not support the attributes will get the default configuration. The different alternatives can be grouped using different attributes that can be specified hierarchically with a top and a lower level. 3GPP Release 6 supports grouping based on bit-rate, according to the SDP bandwidth modifiers AS [RFC4566] and TIAS [RFC3890], and language.

The SDP attributes for a Packet-switched Streaming Service (PSS) have been specified in 3GPP TS 26.234 are:

The media-level attribute "a=alt<id>:<SDP-Line>" carries any SDP line and an alternative identifier.

The media-level attribute "a=alt-default-id:<id>" identifies the default configuration to be used in groupings.

The session-level attribute "a=alt-group" is used to group different recommended media alternatives. This allows providing aggregated properties for the whole group according to the grouping type. Language and bit-rate are two defined grouping types.

A V3C bitstream is composed of V3C units that contain V3C video sub-bitstreams, V3C atlas sub-bitstreams, or a V3C parameter set. The RTP payload format for V3C video sub-bitstreams is defined by appropriate Internet Standards for the applicable video codec. The RTP payload format allows for packetization of one or more V3C Network Abstraction Layer (NAL) units in a RTP packet payload as well as fragmentation of a V3C NAL unit into multiple RTP packets. There are also mechanisms for grouping RTP streams of V3C component sub-bitstreams, providing a complete solution for streaming V3C bitstream.

Different V3C components can be represented by their own respective RTP streams. A grouping tool, as defined in RFC5888, may be extended to support V3C grouping.

Group attribute with V3C type is provided to allow application to identify "m" lines that belong to the same V3C bitstream. Grouping type V3C MUST be used with the group attribute. The tokens that follow are mapped to 'mid'-values of individual media lines in the SDP.

a=group:V3C <tokens> <v3c specific session-level parameters>

The V3C grouping type attribute related v3c-specific session level parameters can include the following optional information:

v3c-parameter-set=<value>
v3c-atlas-data=<value>
v3c-common-atlas-data=<value>
v3c-sei=<value>

When signaled as a session level parameter, the data is considered to be static for the duration of the stream.

The following example shows an SDP including four media lines, three describing V3C video components and one V3C atlas component. All the media lines are grouped under one V3C group which provides the V3C parameter set.

...
a=group:V3C 1 2 3 4 v3c-parameter-set=AF6F00939921878
m=video 40000 RTP/AVP 96
a=rtpmap:96 H264/90000
a=fmtp:96 v3c-unit-header=10000000 // occupancy
a=mid:1
m=video 40002 RTP/AVP 97
a=rtpmap:97 H264/90000
a=fmtp:97 v3c-unit-header=18000000 // geometry
a=mid:2
m=video 40004 RTP/AVP 98
a=rtpmap:98 H264/90000
a=fmtp:98 v3c-unit-header=20000000 // attribute
a=mid:3
m=video 40008 RTP/AVP 100
a=rtpmap:100 v3c/90000
a=fmtp:100 v3c-unit-header=08000000; // atlas
a=mid:4

V3C content is represented by a group attribute in the SDP of the V3C RTP payload format specification. The attribute groups together individual media lines that contain V3C component bitstreams as discussed in the background section. While SDP offers tools, such as session level attribute alt-group to define alternatives of individual media lines, the SDP does not support mechanism for indicating alternatives for groups of content such as a=group:V3C. This means that a single SDP can't support a use case of providing two alternative V3C presentations, where only one of such should be played by the client at a given time. Furthermore, SDP does not define generic mechanism for providing semantics for media that consist of group(s) of groups of media streams represented by individual media lines.

The problem is materialized when an SDP (example below) with two V3C group attributes is generated, where each group comprises multiple "m" lines. The client player does not understand what the relationship between the groups is or how the content should be displayed to the user. E.g., if the two groups are alternatives and only one group should be displayed or if the player should present V3C content from both/all groups at the same time or if the player should present V3C content from any of groups (one or more, up to all) together at the same time.

...
    a=group:V3C 1 2 3 4 v3c-parameter-set=AF6F00939921878;
    a=group:V3C 5 6 7 8 v3c-parameter-set=AF12AH2911821AE;
...

The related technology has several solutions attempting to solve the above problem.

For example, "group" and "mid" attributes defined in RFC 5888 allows to group "m" lines in SDP for different purposes. An example can be for lip synchronization or for receiving a media flow consisting of several media streams on different transport addresses.

An example would be in a given session description, each "m" line is identified by a token, which is carried in a "mid" attribute below the "m" line. The session description carries session-level "group" attributes that group different "m" lines (identified by their tokens) using different group semantics. The semantics of a group describe the purpose for which the "m" lines are grouped. In the example below, the "group" line indicates that the "m" lines identified by tokens 1 and 2 (the audio and the video "m" lines, respectively) are grouped for the purpose of lip synchronization (LS).

v=0
    o=Laura 289083124 289083124 IN IP4 one.example.com
    c=IN IP4 192.0.2.1
    t=0 0
    a=group:LS 1 2
    m=audio 30000 RTP/AVP 0
    a=mid:1
    m=video 30002 RTP/AVP 31
    a=mid:2

RFC5888 defines two semantics for group Lip Synchronization (LS), as used in the example above, and Flow Identification (FID). RFC5583 defines another grouping type Decoding Dependency (DDP). RFC8843 defines another grouping type BUNDLE, which among other is utilized when multiple types of media are sent in a single RTP session as described in RFC8860. RFC8859 provides description of more groups, e.g. for forward error correction (FEC) or Composition Session (CS).

RFC5888 describes a mechanism for grouping multiple media lines a Session Description Protocol (SDP) for different purposes. However, RFC5888 does not support grouping groups of content and each token in the group attribute refers to a single media line.

As another example, V3C RTP Payload Format defines group type for V3C content. However, it does not provide mechanism for signaling alternatives of groups.

As another example, a specification on "Support of Immersive Teleconferencing and Telepresence for Remote Terminals" (ITT4RT) discloses groups. For example, Specification on "IP Multimedia Subsystem (IMS); Multimedia telephony; Media handling and interaction" (reference: TS 26.114) includes a mechanism for providing multiple restricted groups (rest-group), such that receivers can choose to receive one of them. The rest-groups can be indicated with attributes content=main and content=alt. It does not allow grouping of groups for defining encoding alternatives.

As yet another example, RFC 6064 Describes alternative group attribute (a=alt-group) for grouping multiple media lines that consist of alternatives of each other. However, it does not support grouping of groups.

As yet another example, a specification on "Transparent end-to-end Packet-switched Streaming Service (PSS); Protocols and codecs" (reference TS 26.234) specifies that a client should handle an attribute: "alt-group". A client from earlier releases will ignore this attribute and can safely do so. When interpreted, it defines a number of grouping alternatives from which the client can select the most appropriate one. The identifiers "alt" and "alt-default-id" of the specification are used together with the "alt-group" attribute to create combinations consisting of, e.g., one audio and one video alternative.

A grouping attribute is used to recommend certain combinations of media alternatives to the client. There may be more than one grouping attribute at the session level as long as they are for different grouping types and subtypes.

alt-group="a" "=" "alt-group" ":" alt-group-type ":" alt-group-subtype ":" alt-grouping *(";" alt-grouping) CRLF
    alt-group-type=token; "token" defined in RFC 4566
    alt-group-subtype=token;
    alt-grouping=grouping-value "=" alt-id *("," alt-id)
    grouping-value=token The specification defines respectively "alt" for alternatives, and "alt-group", which could be combined.

The specification TS 26.234 also has an attribute for alternative group. Two media-level and one session-level attributes are used in a mechanism for providing alternative SDP lines. One or more SDP lines at media level can be replaced, if desired, by alternatives. The mechanism is backwards compatible in the way that a receiver that does not support the attributes will get the default configuration. The different alternatives can be grouped using different attributes that can be specified hierarchically with a top and a lower level. 3GPP Release 6 supports grouping based on bit-rate, according to the SDP bandwidth modifiers AS [RFC4566] and TIAS [RFC3890], and language.

The SDP attributes are:

The media-level attribute "a=alt<id>:<SDP-Line>" carries any SDP line and an alternative identifier.

The media-level attribute "a=alt-default-id:<id>" identifies the default configuration to be used in groupings.

The session-level attribute "a=alt-group" is used to group different recommended media alternatives. This allows providing aggregated properties for the whole group according to the grouping type. Language and bit-rate are two defined grouping types.

The present embodiments aim to solve the problem as presented above by providing a new feature to be introduced in SDP that would allow grouping groups of content and providing semantics of how different groups should be interpreted. Grouping may be used for indicating that a presentation consists of multiple media component. E.g., audio and video that should be played together can be signaled in a group similarly to different V3C components that consist of a V3C bitstream. The proposed improvement provides a mechanism for indicating semantics between groups of content, aka. presentations.

The present embodiments relate to an encoder (a sender), which is configured to obtain two or more representations of volumetric media content each consisting of multiple media component bitstreams. A representation may be a volumetric presentation or a volumetric media object or a volumetric media item;

identify a relationship between the two or more representations. The relationship may be identified by examining the presentations, or their media component bitstreams, or by interpreting external signaling;

generate a description file;
record a media component description for each media component bitstream in the description file;
group media component descriptions for each media component bitstream;
record the identified relationship between the representations in the description file as grouping information for groups;
provide the description file to a the receiver;
as a response to the provided description file, receive a modified description file from the receiver, where the receiver indicates which media component bitstreams should be delivered to the receiver;
provide a new description file to the receiver when the modified description file indicates receiver does not understand the grouping description. Alternatively, the session may be ended without providing a new description file;
pack each requested media component bitstream into media stream; and
deliver requested media streams to the receiver.

Thus, the encoder operates as a sender in a data transfer with a receiver (i.e., a decoder), where the sender
obtains two or more representations of volumetric media content each consisting of multiple media component bitstreams. A representation may be a volumetric presentation or a volumetric media object or a volumetric media item;
identifies a relationship between the two or more representations. The relationship may be identified by examining the representations, or their media component bitstreams, or by interpreting externally provided information;
generates a description file that;
  contains a media component description for each media component bitstream of each presentation;
  contains group descriptions, each of which indicating/grouping/gathering media component descriptions representing one representation;
  contains grouping information descriptions providing information about relationship between group descriptions representing representations.
and provides the description file to a receiver.

The externally provided information—mentioned above—may be application choices (generated based on application preferences or provided by the user interactive). Alternatively, the externally provided information can be a scene description file or information.

Then, the receiver—according to an embodiment—
obtains the description file comprising
  a media component description for each media component bitstream of each representation of a volumetric media content;
  group descriptions each indicate/group/gather media component descriptions representing one representation;
  grouping information descriptions providing information about relationship between group descriptions representing representations.
identifies the representations and their relationship offered by the sender;
selects one or more of the representations of the offer in the description file based on the derived relationship information. The selection of one or more representations can be performed according to the derived relationship information and additionally, based on the available network and computational resources at the receiver, application preference, user preference or any other external information;
generates a new description file that
  contains description of the selected representation, i.e., media component bitstreams the receiver is expected to receive, or
  contains information that the receiver does not understand the grouping description;
provides the new description file to a sender.

As a response to the new description file from the receiver the sender
delivers the requested media streams to the receiver.

According to an embodiment, the description file is a Session Description Protocol (SDP); whereupon each media component description is recorded as a media line in the SDP; each representation is recorded as group attribute in the SDP.

According to an embodiment, media component bitstreams are packed in real-time protocol media (RTP) streams.

According to an embodiment, a representation consists of a V3C bitstream; whereupon each V3C component is a media component bitstream.

According to an embodiment, a group identifier is added for each group of media streams that consists of a representation; a new type of group attribute is added in SDP to signal that the group attribute tokens refer to other groups in the SDP; new grouping type is added for group attribute that indicates the semantics for the relationship between groups, as identified by tokens, in the new group type attribute.

According to another embodiment, the group attribute is extended to support signaling of multiple groups of content by assigning special characters to separate different groups and to indicate semantics between the different groups.

The decoder (i.e., a receiver) as referred above, is configured to
obtain a description file listing two or more media representations from a sender;
derive from the description file grouping information for the two or more media representations, and media component descriptions composing the two or more media representations;
further derive from the description file information indicating the relationship between the two or more representations;
select one or more presentation and the related component media descriptions based on the derived relationship information;
remove from the description file media representation descriptions that are not understood;
send modified description file to the sender requesting the selected media listed in the original description file;
obtain a new description file from the sender when the modified description file indicates receiver does not understand the original description file;
receive from the sender the requested media streams; and
display one or more requested representations to the user based on the relationship information.

It is to be noticed that the SDP is used as an example protocol, and the present embodiments are not limited to only SDP. The practical implementations of the grouping mechanism described with reference to various embodiments, can be realized by any communication protocol which is able to carry the same information using possibly a different syntax.

The SDP description can be used in the Offer-Answer session negotiation in such a way that the two or more presentations and their grouping relationship is presented in the session offer. The selected representations (in accordance with the grouping relationship) are retained in the answer.

According to another embodiments, the network topology which can be applied to the present embodiments, includes—but is not limited to—point-to-point, client-server, one to many (broadcast/multicast), peer-to-peer, multiparty conferencing.

The present embodiments are discussed in more detailed manner in the following. The embodiments may rely on SDP signalling for establishing RTP streaming between the sender and the receiver for content which consist of multiple representations, which in turn consist of multiple media components. An example for such content is V3C content, comprising attribute, geometry, occupancy, and atlas component bitstreams. Other possible scenarios may exist where SDP contains multiple representations. In SDP, representations may be grouped together using a grouping attribute as described in the background material. For V3C presentation, a dedicated grouping type is defined a=group:V3C.

An SPD answerer may remove from the SDP any attributes and parameters that it does not understand. If the group parameter as defined with respect to the present embodiments is removed int eh SDP answer or if a client requests some but not all of the media streams that are part of a single group that are not to be rendered or decoded together, a sender can assume that the answerer does not understand the offer and send a modified SDP offer without the said functions for backward compatibility. In this scenario, the receiver is responsible for determining optimal rendering of media streams in the SDP, which may result non-defined player behavior.

First Example

One example of the solution relies on providing a new group-type for grouping representations in the SDP. In this example, the grouping type resembles how groups of media streams are defined in SDP using RFC 5888 but extends it for grouping groups of content. The new grouping method is defined as follows:

a=group:<group-type> <tokens> <grouping parameters>

<group-type> equal to "group" indicates that the grouping is applied for other groups of content and that the <tokens> refer to group-ids of other groups rather than media identifiers or individual media lines in the SDP. <grouping parameters> are additional grouping level parameters containing information that applies to all groups identified by the <tokens>. <grouping parameters> is a semicolon separated list of key=value parameter pairs.

In addition to defining a new group-type, a new group-id parameter is defined that can be used by all group attributes in the SDP. The group id is defined as any grouping parameters with a key=value pair. The key for group id is "group-id" and the value represents unique identifier for the group. An example of the parameter with group id equal to 1 is given below.

group-id=1

Furthermore, another new grouping parameter is defined, which is only applicable for groups, where <group-type> is equal to "group". The key for the grouping type is "grouping-type" and the value of the parameter indicates the relationship between the groups (identified by tokens) in the group attribute. Possible values for the grouping type parameter can be "alternative", "content", "all". Alternative value indicates that only one of the representations should be played at a given time. The content value indicates that both representations should be played at the same time, but if any of the groups cannot be selected it is permitted. The "all" value indicates that both (or all) presentations shall be played at the same time, if any of the representations cannot be handled, the answer response shall reject all the presentations in the "all" grouping. The example below indicates grouping type for alternative representations.

grouping-type=alternative

An alternative mechanism for indicating the parameter value is to reserve values for specific semantics. As an example, grouping for alternatives could be done by assigning value=1 for alternative semantics. In this example the grouping-type=1, would indicate that the groups in the group should be considered as alternative representations of each other. Other values could be reserved for other semantics.

It is important to note that the definitions above describe one example of defining the new grouping type in SDP, the special characters and variable names may be different, but still convey the same functionality.

Below is an example of an SDP file where two V3C presentations are grouped using V3C grouping type and assigned a unique group-id using the group-id grouping parameter. One of the representations is identified by group-id=1 and the other by group-id=2. Each V3C representation groups together all media streams that contain information for said V3C representation, i.e., representation with group-id=1 consist of media streams with a=mid:1, a=mid:2, a=mid:3 and a=mid:4.

The two V3C representations are grouped together by the new group grouping type a=group:group. The tokens (1 and 2) of the new group attribute refer to the group-ids of the V3C representations. Grouping-type parameter "alternative" indicates that the groups with group-ids 1 and 2 should be considered as alternatives of each other, and only one group should be played at a given time.

. . .
a=group:group 1 2 grouping-type=alternative
a=group:V3C 1 2 3 4 v3c-parameter-set=AF6F00939921878;group-id=1;
a=group:V3C 5 6 7 8 v3c-parameter-set=EE227618EA21199;group-id=2;
m=video 40000 RTP/AVP 96
a=rtpmap:96 H264/90000
a=fmtp:96 v3c-unit-header=10000000 // occupancy
a=mid:1
m=video 40002 RTP/AVP 97
a=rtpmap:97 H264/90000
a=fmtp:97 v3c-unit-header=18000000 // geometry
a=mid:2
m=video 40004 RTP/AVP 98
a=rtpmap:98 H264/90000
a=fmtp:98 v3c-unit-header=20000000 // attribute
a=mid:3
m=video 40008 RTP/AVP 100
a=rtpmap:100 v3c/90000
a=fmtp:100 v3c-unit-header=08000000; // atlas
a=mid:4
. . .

A more complex example with two different types of grouping is described below. In this example, the SDP consist of four V3C representations, where presentations with group-id 1 and 2 are alternatives of each other, and presentations with group-id 3 and 4 are alternatives of each other. The two alternative groups are considered complementary by another group in the SDP. This means that at a given time the client should display media belonging to group 1 or group 2 and group 3 or group 4.

. . .
    a=group:group X Y grouping-type=complementary
    a=group:group 1 2 grouping-type=alternative;group-id=X
    a=group:group 3 4 grouping-type=alternative;group-id=Y
    a=group:V3C 1 2 3 4 v3c-parameter-set=AF6F00939921878;group-id=1;
    a=group:V3C 5 6 7 8 v3c-parameter-set=EE227618EA21199;group-id=2;
    a=group:V3C 9 10 11 12 v3c-parameter-set=AEGE12366DAAD;group-id=3;
    a=group:V3C 13 14 15 16 v3c-parameter-set=EAD38AEEGGFF09;group-id=4;
. . .

Second Example

The second example relies on extending the group attribute by allowing to list multiple groups in a single attribute. The extension is done by allocating special characters to split the elements of the grouping list. Special characters may be assigned specific semantic indication.

The extension of the group attribute can be defined as follows:
    a=group:<group-type>
        <tokens> <grouping parameters> <special-character>
        <tokens> <grouping parameters>

<group-type> can be any group type defined in RFC 5888 or any other specification e.g., V3C.

<tokens> indicate the media identifiers (a=mid) for individual media streams in the SDP.

<grouping parameters> contains a semicolon separated list of grouping parameters for the group of media lines indicated by the <tokens>.

<special-character> is a character that separates individual groups in the group attribute and provides semantic between the preceding and succeeding elements in the list.

Elements of the list may be further grouped together by chaining elements using brackets. The evaluation of operations between chained elements may be done according to mathematic principles. E.g., in the below example there are three groups, two of which are grouped together inside the brackets and a third one which is outside of the brackets. The evaluation may first be performed on the elements inside the brackets and the resulting evaluation is there after performed to the group outside of the brackets.

(<tokens> <grouping parameters> <special-character>
        <tokens><grouping parameters>)<special-character>
        <tokens> <grouping parameters>

An example of grouping two V3C presentations using the <special-character> based method is described below. In this example the special character @ indicates that the two elements of the list should be considered as encoded alternatives of each other and only one presentation should be played at a time.

a=group:V3C 1 2 3 4 v3c-parameter-set=AF6F00939921878 @
    5 6 7 8 v3c-parameter-set=EE227618EA21199

A table of special characters and their semantic interpretations may be defined in order to enable efficient signaling in SDP.

A more complex example including chaining of list elements is described below. This example can be interpreted exactly the same as the above complex example using multiple group attribute lines.

a=group:V3C (1 2 3 4 v3c-parameter-set=AF6F00939921878 @
    5 6 7 8 v3c-parameter-set=EE227618EA21199) ?
    (9 10 11 12 v3c-parameter-set=AEGE12366DAAD @
    13 14 15 16 v3c-parameter-set=EAD38AEEGGFF09)

Third Example

According to an embodiment, the attribute a=alt-group is extended to offer alternatives of groupings of groups and media lines. New subtypes may be defined for video components, e.g., COL for colour. In this example, it is expected that no new signaling is added in SDP to indicate the alt-group attribute refers to group-ids instead of a:mid values, this would require that the group-id and media ids to share the same unique space of values. This somewhat complicates the parsing process of the SDP as the parser would need to find all group-id parameters and a:mid values and it assumes that the parser understands group-id parameters.

It is to be noticed that in practice some mechanism for signaling whether the alt-group refers to a:mid or <group-id> parameter value is likely needed for backwards compatibility which is why this is only the third example.

The extension could be defined as follows:
    a=alt-group:<alt-group-type>:<alt-group-subtype>:
        <grouping-value>=<token>;<grouping-value>=<token>

The components of the alt-group attribute are as defined in 3GPP TS 26.234, but the grouping value token is expected to refer group-id parameter associated with the group attributes in SDP.

Below is an example that uses the proposed signaling and provides an alternative color (COL) grouping type using CSS-based values "red" and "blue" to as the grouping value for content in groups X and Y.

a=alt-group:COL:css:red=X;blue=Y
    a=group: group 1 2 grouping-type=alternative;group-id=X
    a=group: group 3 4 grouping-type=alternative;group-id=Y
    a=group:V3C 1 2 3 4 v3c-parameter-set=AF6F00939921878;group-id=1;
    a=group:V3C 5 6 7 8 v3c-parameter-set=EE227618EA21199;group-id=2;
    a=group:V3C 9 10 11 12 v3c-parameter-set=AEGE12366DAAD;group-id=3;
    a=group:V3C 13 14 15 16 v3c-parameter-set=EAD38AEEGGFF09;group-id=4;
. . .

Different Grouping Types

A semantic relationship may be defined for the groups that are grouped together using the parameter grouping-type. The semantic relationship may be:

| special-character | grouping-type | semantics |
| --- | --- | --- |
| @ | "alternative" | the groups provide alternative encodings for the same media content, e.g., to cater to different device capabilities. |

-continued

| special-character | grouping-type | semantics |
| --- | --- | --- |
| $ | "content" | the groups provide alternative media content. |
| ? | "complementary" | the groups should be rendered together. |
| % | "complementary rate-adaptive" | The groups should be rendered together, but the group that follows % may not be rendered for rate adaptation purposes. |
| reserved | "reserved" | reserved |

The values and descriptions here should only be considered as examples. In addition, new values or grouping types may be added using the mechanisms described in this specification.

Figure 4:
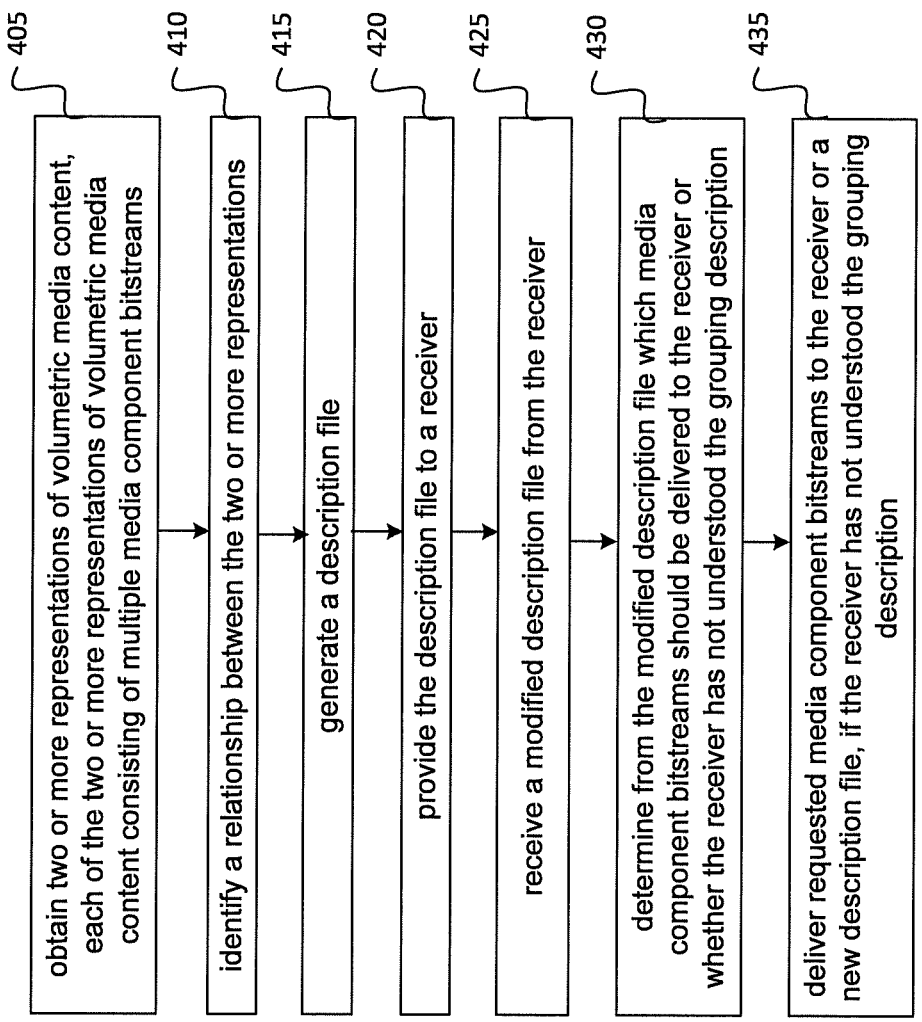
FIG. 4 is a flowchart of a method according to an embodiment.

The method for encoding according to an embodiment is shown in FIG. 4. The method generally comprises obtaining 405 two or more representations of volumetric media content, each of the two or more representations of volumetric media content consisting of multiple media component bitstreams; identifying 410 a relationship between the two or more representations; generating 415 a description file, the description file containing a media component description for each media component bitstream; group descriptions grouping the media component descriptions for each media component bitstream; grouping information descriptions providing information on the identified relationship between group descriptions representing representations; providing 420 the description file to a receiver; receiving 425 a modified description file from the receiver; determining 430 from the modified description file which media component bitstreams should be delivered to the receiver or whether the receiver has not understood the grouping description; and delivering 435 requested media component bitstreams to the receiver or a new description file, if the receiver has not understood the grouping description. Each of the steps can be implemented by a respective module of a computer system.

An apparatus according to an embodiment comprises means for obtaining two or more representations of volumetric media content, each of the two or more representations of volumetric media content consisting of multiple media component bitstreams; means for identifying a relationship between the two or more representations; means for generating a description file, the description file containing a media component description for each media component bitstream; group descriptions grouping the media component descriptions for each media component bitstream; grouping information descriptions providing information on the identified relationship between group descriptions representing representations; means for providing the description file to a receiver; means for receiving a modified description file from the receiver; means for determining from the modified description file which media component bitstreams should be delivered to the receiver or whether the receiver has not understood the grouping description; and means for delivering requested media component bitstreams to the receiver or a new description file, if the receiver has not understood the grouping description. The means comprises at least one processor, and a memory including a computer program code, wherein the processor may further comprise processor circuitry. The memory and the computer program code are configured to, with the at least one processor, cause the apparatus to perform the method of FIG. 4 according to various embodiments.

Figure 5:
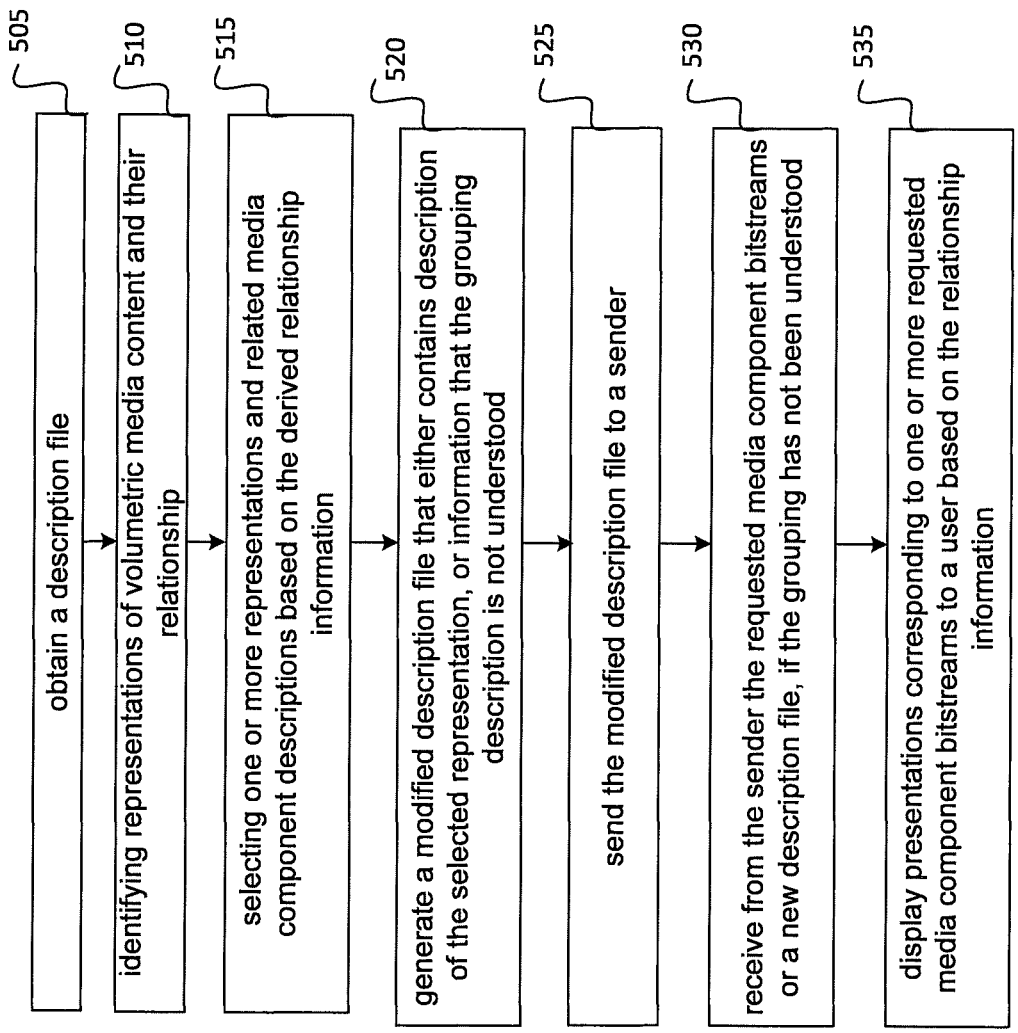
FIG. 5 is a flowchart of a method according to another embodiment.

The method for decoding according to an embodiment is shown in FIG. 5. The method generally comprises obtaining 505 a description file comprising a media component description for each media component bitstream; group descriptions grouping the media component descriptions for each media component bitstream; grouping information descriptions providing information on the identified relationship between group descriptions representing representations of volumetric video content; identifying 510 the representations and their relationship; selecting 515 one or more representations and related media component descriptions based on the derived relationship information;

generating 520 a modified description file that either contains description of the selected representation, or information that the grouping description is not understood; sending 525 the modified description file to a sender; receiving 530 from the sender the requested media component bitstreams or a new description file, if the grouping has not been understood; and displaying 535 representations corresponding to one or more requested media component bitstreams to a user based on the relationship information. Each of the steps can be implemented by a respective module of a computer system. An apparatus according to an embodiment comprises means for obtaining a description file comprising a media component description for each media component bitstream; group descriptions grouping the media component descriptions for each media component bitstream; grouping information descriptions providing information on the identified relationship between group descriptions representing representations of volumetric media content; means for identifying the representations and their relationship; selecting one or more representations and related media component descriptions based on the derived relationship information; means for generating a modified description file that either contains description of the selected representation, or information that the grouping description is not understood; means for sending the modified description file to a sender; means for receiving from the sender the requested media component bitstreams or a new description file, if the grouping has not been understood; and means for displaying representations media content corresponding to one or more requested media component bitstreams to a user based on the relationship information. The means comprises at least one processor, and a memory including a computer program code, wherein the processor may further comprise processor circuitry. The memory and the computer program code are configured to, with the at least one processor, cause the apparatus to perform the method of FIG. 5 according to various embodiments.

It is to be noticed that in a complete data transfer process, after step 420 of FIG. 4, the method proceeds to steps 505-525 of FIG. 5, after which it returns back to FIG. 4 and steps 425-435. After step 435, the overall process comprises the last steps 530-535 of FIG. 5.

Figure 6:
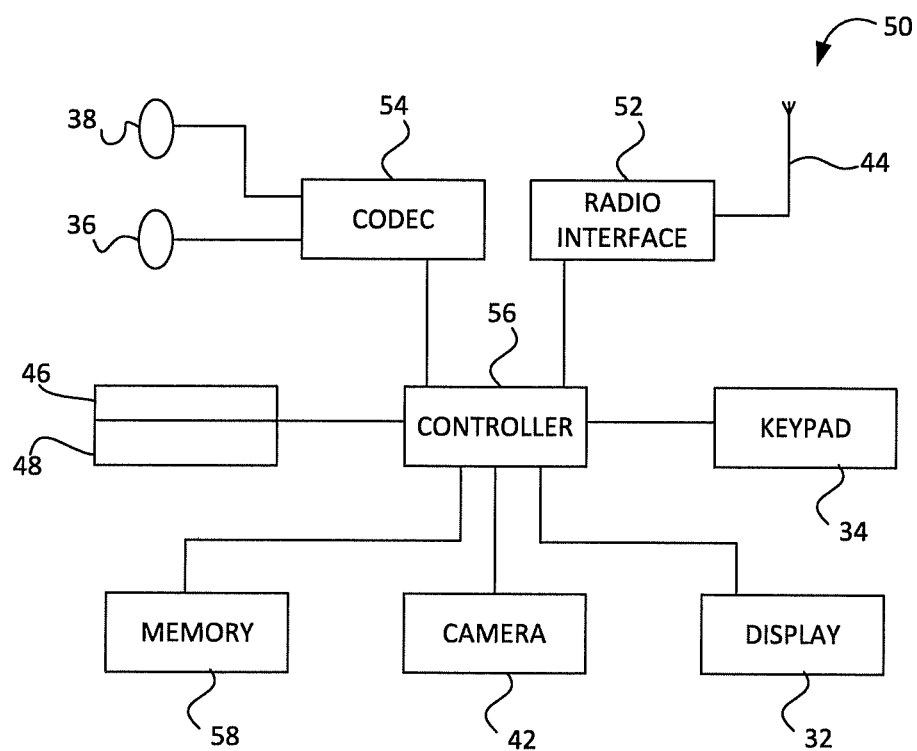
FIG. 6 shows an apparatus according to an embodiment.

An example of an apparatus is disclosed with reference to FIG. 6. FIG. 6 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments may provide advantages. For example, The solution enables grouping of groups in SDP for real-time streaming session negotiation and providing semantics for said groupings. For example, the signaling allows indicating which groups of content should be considered alternatives of each other and thus only one of the groups should be played at a given time. Alternatively, grouping type can indicate that different groups should be played together.

One of the proposed embodiments is additionally backwards compatible with general grouping concept in SDP, which enables adoption without breaking previous versions or introducing non-compatible version.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus for encoding, comprising:
   at least one processor; and
   at least one memory storing instructions that, when executed with the at least one processor, cause the apparatus to perform:
   obtaining two or more representations of volumetric media content, the two or more representations of volumetric media content comprising multiple media component bitstreams;
   identifying a relationship between the two or more representations;
   generating a description file, the description file containing;
     a media component description for the media component bitstreams;
     group descriptions grouping the media component descriptions for the media component bitstreams; and
     grouping information descriptions providing information on the identified relationship between group descriptions representing representations;
   providing the description file to a receiver;
   receiving a modified description file from the receiver;
   determining from the modified description file which media component bitstreams should be delivered to the receiver or whether the receiver has not understood the grouping description; and
   delivering requested media component bitstreams to the receiver or a new description file, if the receiver has not understood the grouping description.

2. The apparatus according to claim 1, wherein the instructions when executed with the at least one processor, cause the apparatus to identify the relationship with examining the two or more representations, or their media component bitstreams, or with interpreting external signaling.

3. The apparatus according to claim 1, wherein the description file is a session description protocol.

4. The apparatus according to claim 1, wherein the instructions, when executed with the at least one processor, cause the apparatus to perform packing the media component bitstreams in real-time transfer protocol media streams.

5. The apparatus according to claim 1, wherein a presentation comprises a V3C bitstream.

6. The apparatus according to claim 1, wherein the instructions, when executed with the at least one processor, cause the apparatus to perform adding a group identifier for the groups of media stream.

7. An apparatus for decoding, comprising:
at least one processor; and
at least one memory storing instructions that, when executed with the at least one processor, cause the apparatus to perform:
obtaining a description file comprising,
a media component description for a media component bitstream;
group descriptions grouping the media component descriptions for the media component bitstream; and
grouping information descriptions providing information on the identified relationship between group descriptions representing representations of volumetric media content;
identifying the representations and their relationship;
selecting one or more representations and related media component descriptions based on the derived relationship information;
generating a modified description file that either contains,
description of the selected representation, or
information that the grouping description is not understood;
sending the modified description file to a sender;
receiving from the sender the requested media component bitstreams or a new description file, if the grouping information has not been understood; and
displaying representations corresponding to one or more requested media component bitstreams to a user based on the relationship information.

8. The apparatus according to claim 7, wherein the instructions, when executed with the at least one processor, select the one or more representations according to the derived relationship information and optionally also one or more of the following: the available network, computational resources, application preference, or user preference.

9. A method for encoding, comprising:
obtaining two or more representations of volumetric media content, the two or more representations of volumetric media content comprising multiple media component bitstreams;
identifying a relationship between the two or more representations;
generating a description file, the description file containing;
a media component description for the media component bitstreams;
group descriptions grouping the media component descriptions for the media component bitstreams; and
grouping information descriptions providing information on the identified relationship between group descriptions representing representations;
providing the description file to a receiver;
receiving a modified description file from the receiver indicating which media component bitstreams should be delivered to the receiver or whether the receiver has not understood the grouping description; and
delivering requested media component bitstreams to the receiver or a new description file, if the receiver has not understood the grouping description.

10. A method for decoding, comprising:
obtaining a description file comprising,
a media component description for a media component bitstream;
group descriptions grouping the media component descriptions for the media component bitstream; and
grouping information descriptions providing information on the identified relationship between group descriptions representing representations of volumetric media content;
identifying the representations and their relationship;
selecting one or more representations and related media component descriptions based on the derived relationship information;
generating a modified description file that contains either,
description of the selected representation, or
information that the grouping description is not understood;
sending the modified description file to a sender;
receiving from the sender the requested media component bitstreams or a new description file, if the grouping has not been understood; and
displaying representations corresponding to one or more requested media component bitstreams to a user based on the relationship information.

11. A non-transitory program storage device readable with an apparatus, tangibly embodying a program of instructions executable with the apparatus for performing the method of claim 9.

12. A non-transitory program storage device readable with an apparatus, tangibly embodying a program of instructions executable with the apparatus for performing the method of claim 10.

* * * * *